April 2, 1963  J. W. HOOGENDONK  3,083,406
PRILLING DEVICE
Filed Nov. 20, 1961
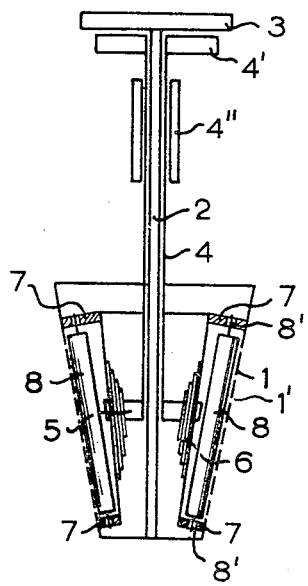
FIG.1
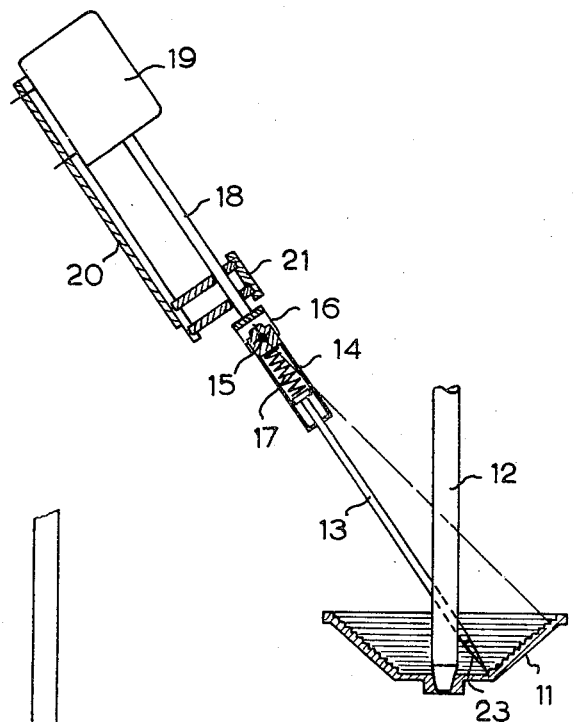
FIG. 2
FIG. 3
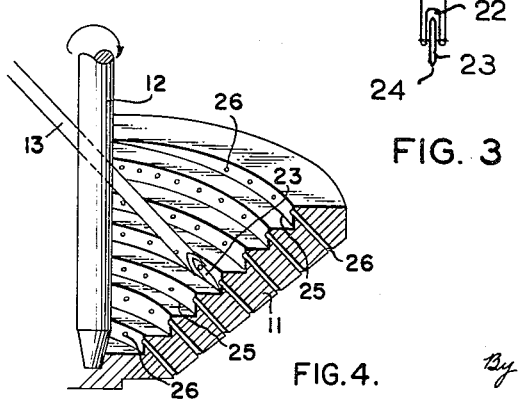
FIG. 4.
Inventor
Johan W. Hoogendonk
By Tourover and Browdy
Attorneys

United States Patent Office 3,083,406
Patented Apr. 2, 1963

3,083,406
PRILLING DEVICE
Johan W. Hoogendonk, Geleen, Netherlands, assignor to Stamicarbon N.V., Heerlen, Netherlands
Filed Nov. 20, 1961, Ser. No. 153,600
Claims priority, application Netherlands Nov. 21, 1960
9 Claims. (Cl. 18—2.6)

It is known that globular fertilizer granules can be prepared by spraying a fertilizer melt, such as ammonium nitrate, mixed with limestone or dicalcium phosphate, or a melt of a nitrogen-phosphate-potassium fertilizer, through small apertures provided in the wall of a reservoir rotating around a vertical axis, the so-called "prilling cup." During their fall, the sprayed drops solidify to form round granules with a smooth surface, the so-called "prills."

When carried out on a technical scale, it was found that the above process had to be frequently interrupted because the spray openings in the prilling cup became clogged with solidified melt.

U.S. application, Serial No. 47,784, filed on August 5, 1960, now Patent No. 3,055,049, describes a device for spraying melts consisting of a reservoir which rotated about a vertical axis and the upright walls of which were provided with spray openings, and a scraping element was mounted in the reservoir in such a way that the inner wall of the reservoir was cleaned by the scraping element while the reservoir rotated. The scraping element was shown to be either blade-shaped or pin-shaped.

When a device of this type is used for spraying viscous fertilizer melts, of the type heretofore mentioned, the end of the scraper which is turned towards the wall of the reservoir has been found to wear rapidly.

It is therefore an object of the present invention to provide an improved prilling device which prevents clogging of the spray openings and which has a relatively long life.

A further object of the present invention is to provide an improved prilling device which utilizes a rolling member for preventing clogging of the spray openings.

Other objects and the nature and advantages of the instant invention will be apparent from the following description taken in conjunction with the accompanying drawings, wherein:

FIGURE 1 is a diagrammatic sectional view of one form of the prilling device;

FIGURE 2 is a diagrammatic sectional view of a modified form of the invention;

FIGURE 3 is an enlarged detailed view of the roller of FIGURE 2; and

FIGURE 4 is an enlarged view of a section of the prilling cup of FIGURE 2.

In accordance with the present invention it has been found that prills of good quality can be obtained if the melt is sprayed from a reservoir which has a scraper arrangement including a rotatory element rolling along the upright wall of the reservoir while the latter rotates. Owing to the rolling movement of the said element the inner wall of the reservoir remains clean and the spray openings do not become clogged. Due to the thixotropic properties of the melts to be sprayed, the shearing stresses produced by the rolling movement of the rotatory element causes the melts to remain sufficiently fluid so that no solid material will deposit on the wall or in the spray openings.

Referring to FIGURE 1, the prilling cup consists of a conical reservoir 1 which is attached to a vertical shaft 2, the end of which is provided with a driving pulley 3. The shaft 2 runs through a hollow shaft 4, one end of which is provided with two fastening devices 5, each of which holds a laminated spring 6. The ends of the longest spring plates are provided with perforated locking elements 7 serving to retain the conical elements 8 which are provided at each end with pins 8'. The other end of shaft 4 is provided with a driving pulley 4'. The shaft 4 is supported in a bearing 4''.

By means of the driving pulleys 3 and 4' the shaft 2 and the shaft 4 can be caused to rotate at various operating speeds.

During the operation of the device the conical elements roll along the inner wall of the conical reservoir 1, as a result of which the spray openings 1' are prevented from becoming clogged due to the thixotropic melt to be sprayed solidifying prematurely.

In addition to prilling cups with a smooth inner wall, as shown in FIGURE 1, use can be made of prilling cups whose inner walls are provided with a spiral groove 25 in which spray openings 26 are located. Such a device is illustrated in FIGURES 2 and 4. With such a grooved prilling cup wall, a pin-shaped scraping element having a wheel at the end thereof may be used.

The prilling cup 11 is attached to the vertical shaft 12, which can be made to rotate by a motor (not shown in the drawing). The top end of a pin 13 is housed in a holder 14 which turns on a pivot 15 provided in a fork 16. This fork 16 is attached to the end of a sliding bar 18 which is periodically raised for a short moment by the lifting magnet 19. The lifting magnet is attached to a mounting plate 20. The sliding bar 18 is guided in a guide 21.

The lower end of the pin 13 is provided with a recess 22 in which a wheel 23 with a sharp tread 24 is rotatably mounted as best shown in FIGURE 3. The wheel 23 rests in the spiral groove 25 provided in the inner wall of the prilling cup. While the prilling cup is rotating, the wheel 23 revolves and travels upwardly in this groove. When the wheel is in its highest position, the lifting magnet 19 provided with a suitable time relay (not shown) serves to pull the wheel out of the groove, so that it resumes its lowest position.

Since the distance between the pivot 15 and the top end of the groove is somewhat greater than the distance between the pivot and the bottom end of the groove, the pin holder has been provided with a pressure spring 17 which adjusts this difference in distance so that the wheel always remains in the groove.

I claim:

1. A device for spraying melts comprising in combination: a shaft; means for rotating said shaft; a vessel mounted on said shaft for rotation therewith, said vessel having a bottom wall and a conically shaped upright wall provided with a plurality of spray openings therethrough; and at least one rotatory element rolling along the inner wall of said vessel while the latter rotates, whereby the upright wall and spray openings are continually cleaned.

2. A device according to claim 1 wherein said rotatory element is mounted for rotation on a member which is in turn mounted for rotation on an axis coincident with that of said shaft, and means for rotating said member.

3. A device according to claim 2 wherein a resilient means is provided between said rotatory element and said member to maintain said element in contact with the inner wall of said vessel.

4. A device according to claim 1 wherein the spray openings are disposed in a spiral groove provided on the inner surface of said upright wall, and the rotatory element is a wheel in engagement with and traveling along said groove.

5. A device according to claim 4 wherein the wheel is rotatably mounted at one end of a rod which is pivotally mounted at its other end and provided with spring biasing means to maintain said wheel in contact with the inner walls of said vessel.

6. A device according to claim 5 wherein means are provided for removing the wheel from the upper end of the spiral groove and repositioning it in the lower end of said groove.

7. A device according to claim 1 wherein said rotatory element is a conically shaped elongated roller with its elongated conical wall in rolling contact with the conical upright wall of said vessel.

8. A device according to claim 2 wherein said rotatory element is a conically shaped elongated roller with its elongated conical wall in rolling contact with the conical upright wall of said vessel.

9. A device according to claim 3 wherein said rotatory element is a conically shaped elongated roller with its elongated conical wall in rolling contact with the conical upright wall of said vessel.

References Cited in the file of this patent
UNITED STATES PATENTS

| | | |
|---|---|---|
| 1,352,623 | Perry | Sept. 14, 1920 |
| 2,180,968 | Schorn et al. | Nov. 21, 1939 |
| 2,361,709 | Roelen | Oct. 31, 1944 |
| 2,499,026 | Johnson | Feb. 28, 1950 |
| 2,919,184 | Osswall et al. | Dec. 29, 1959 |
| 2,979,764 | Andrew | Apr. 18, 1961 |